Feb. 27, 1968   M. W. LOVELAND   3,370,625
APRICOT PITTING MACHINE
Filed May 25, 1966   3 Sheets-Sheet 1

INVENTOR.
MALCOLM W. LOVELAND
BY
ATTORNEYS

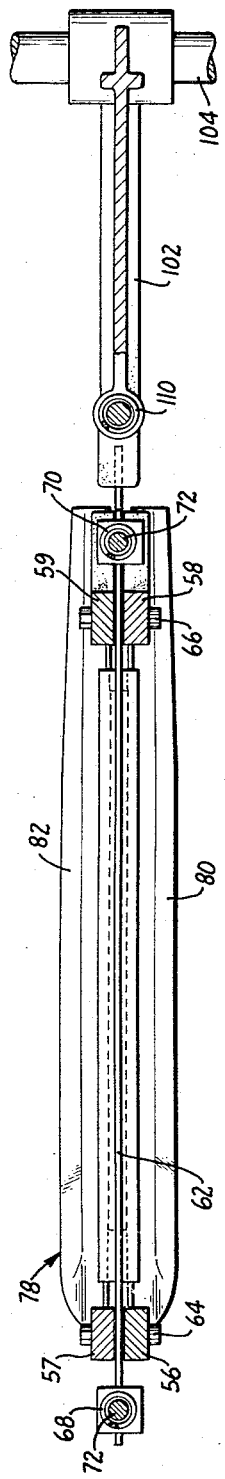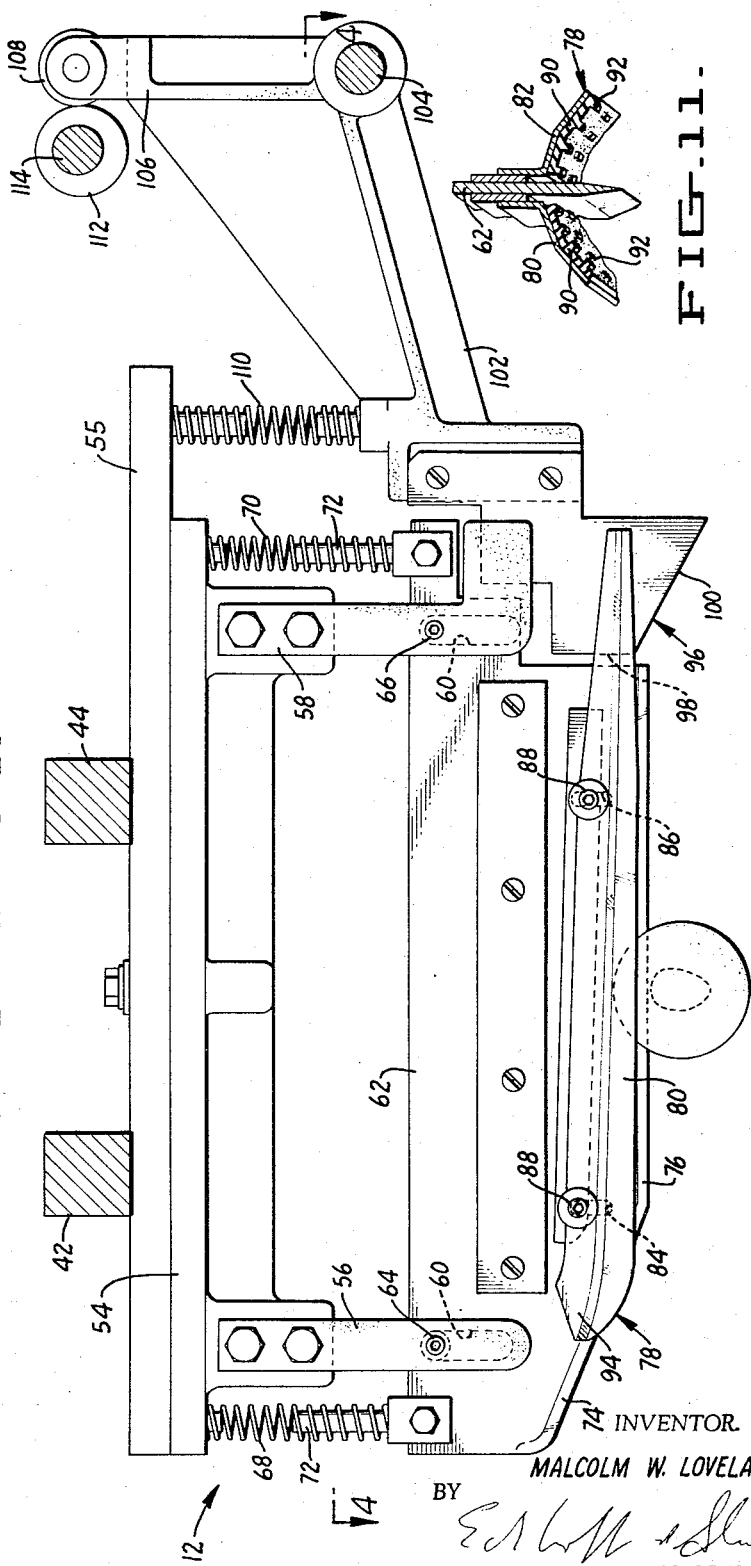

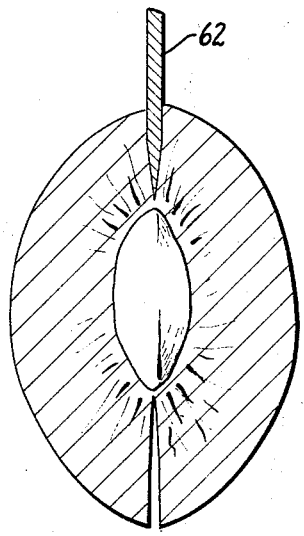
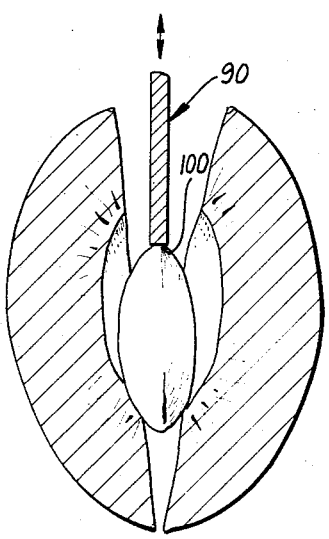
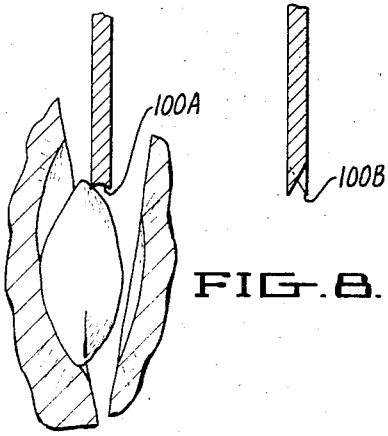
FIG. 5.  FIG. 6.  FIG. 7.
FIG. 8.
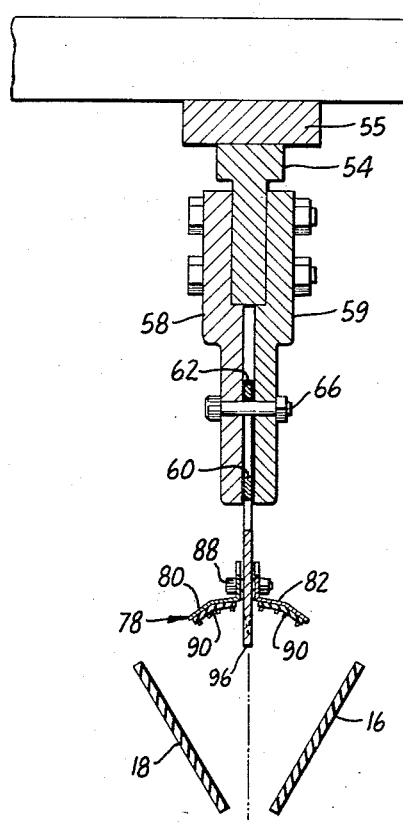
FIG. 9.
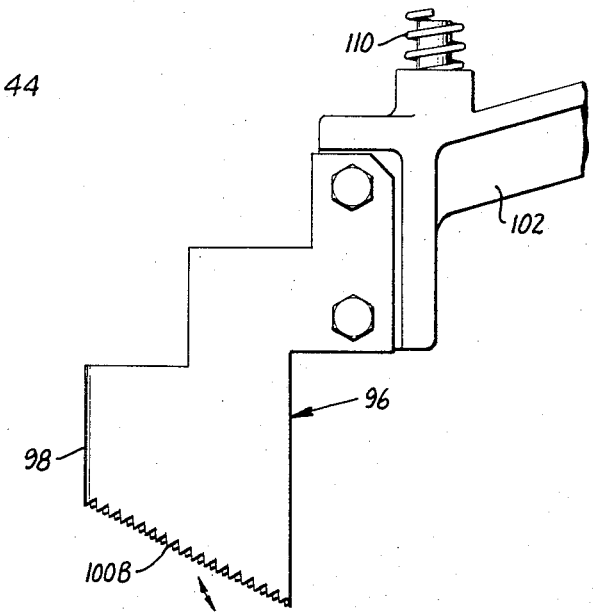
FIG. 10.
INVENTOR.
MALCOLM W. LOVELAND
BY
ATTORNEYS

United States Patent Office 3,370,625
Patented Feb. 27, 1968

3,370,625
APRICOT PITTING MACHINE
Malcolm W. Loveland, Emeryville, Calif., assignor to Atlas-Pacific Engineering Co., a corporation of California
Filed May 25, 1966, Ser. No. 552,861
10 Claims. (Cl. 146—28)

This invention relates to an apricot cutting machine and more particularly relates to a machine wherein an apricot is aligned on its suture axis by a prior machine and then passes under a floating knife which cuts the apricot substantially on its suture plane and thereafter a pit kicker removes the pit from the apricot.

Most apricots are of a free pit nature and it is only necessary to cut the fruit in half and the pit will ordinarily fall out. However, there is always a certain percentage of apricots wherein the pit is not free and tends to stick to one or both halves of the cut apricot.

Apricot cutting machines having a floating non-rotating knife have heretofore been known such as that described in Patent 2,735,466 wherein the apricot is rolled under a floating knife, the knife severing the apricot and thereafter a hook or tail forming a part of the knife dislodges the free pit as the apricot passes underneath the hook. Such a structure works well with free pit apricots but tends to jam-up when an apricot with a stuck pit is encountered. On hand-fed machines, this occurrence is easily rectified by the operator but on modern automatic machinery, many apricots are damaged before such a jam will clear itself.

It is a primary object of the present invention to provide an apricot cutting machine wherein the pits are dislodged in a positive manner.

Another object of this invention is to provide an apricot cutting machine having an oscillating pit kicker which positively dislodges stuck pits.

A still further object of this invention is to provide an apricot cutting machine wherein a shroud covering the knife has a plurality of resilient fingers, imparting a positive rolling motion to the apricot thus facilitating cutting.

A still further object of this invention is to provide such a structure wherein the shroud can be adjusted relative to the knife whereby the machine will accommodate apricots of various sizes.

Still another object of this invention is to provide a device wherein the knife and kicker are mounted on a common carriage which can be raised or lowered to accommodate apricots of various sizes.

Other objects will be apparent from the balance of the specification which follows.

In the drawings forming part of this application:

FIGURE 3 is an enlarged side view of the cutting and pit dislodging mechanism shown in FIGURE 1.

FIGURE 4 is a section on the line 4—4 of FIGURE 3.

FIGURE 5 is an enlarged section through an apricot showing the action of the cutting knife.

FIGURE 6 is a section through an apricot showing the action of the pit kicker.

FIGURE 7 is a partial view similar to FIGURE 6 showing another form of pit kicker.

FIGURE 8 is a section of a still further form of pit kicker.

FIGURE 9 is a section on the line 9—9 of FIGURE 1.

FIGURE 10 is an enlarged side view of a pit kicker constructed in accordance with the present invention.

FIGURE 11 is a perspective view showing the relationship between the cutting knife and shroud.

Figure 1:
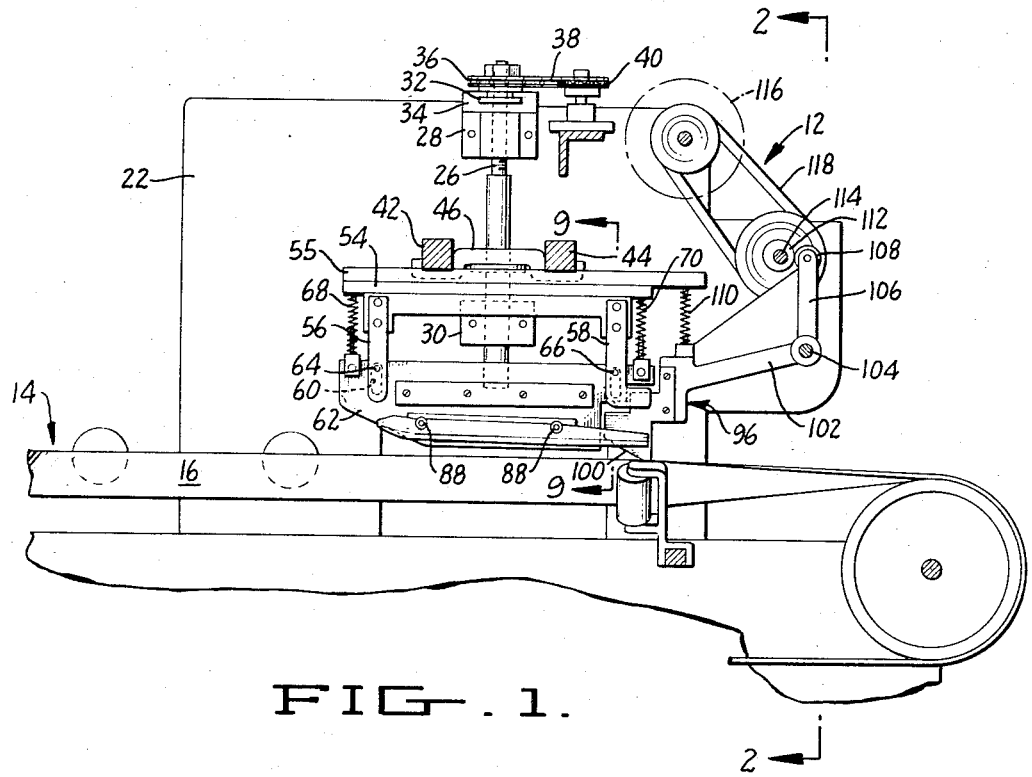
FIGURE 1 is a side view, partly in section, of a device embodying the present invention.
Figure 2:
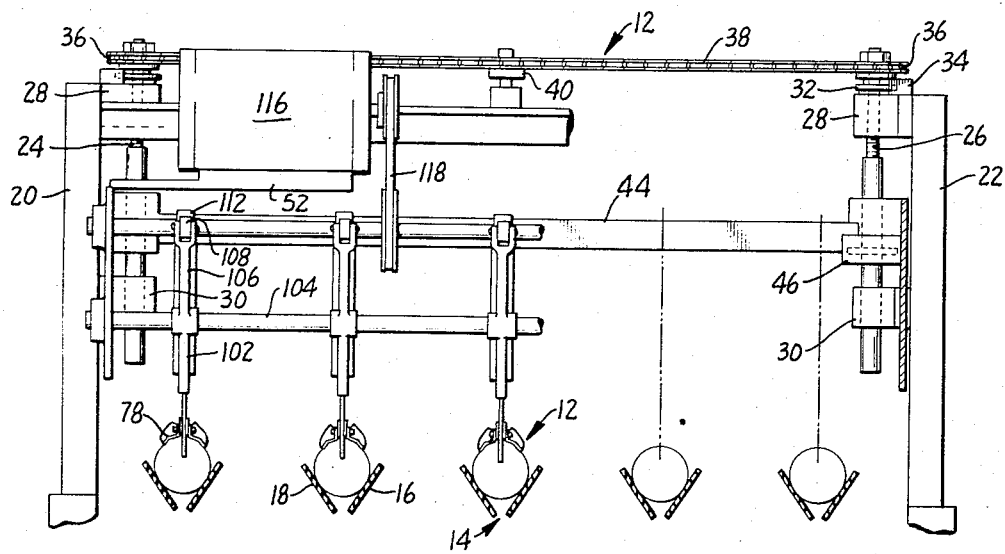
FIGURE 2 is an end view on the line 2—2 of FIGURE 1.

Referring now to the drawings by reference characters, the device of the present invention, generally designated 12, is mounted over the discharge end of an apricot orienting and propelling mechanism generally designated 14. The orienting mechanism 14 is not described in detail since it forms no part of the present invention. However, it can be of the type shown in co-pending patent application, Ser. No. 452,479, filed May 3, 1965, now Patent No. 3,272,311, wherein a plurality of lanes are provided, each of which includes moving belts 16 and 18 arranged in a generally V-shaped configuration for the purpose of propelling the apricots down a desired path. In the embodiment illustrated, five such lanes are provided although it will be obvious to those skilled in the art that a smaller or larger number of lanes might be employed.

The overall structure includes side frame members 20 and 22 which slideably support threaded shafts 24 and 26 mounted on guides 28 and 30. At the upper end of each threaded shaft is a sprocket 36 which is internally threaded. The sprockets 36 have a hexagon on their upper surfaces so they may be turned with a wrench. The lower hub of the sprocket has a flange 32 which fits into a grooved block 34 affixed to the guide 28. As the nut sprocket is turned on the threaded shafts 24 and 26 the shafts are moved upwards or downwards depending on the direction the sprocket is turned. The sprockets are tied together by means of a roller chain 38 which passes over a tightner sprocket 40. By this arrangement when one sprocket is turned, the other sprocket is turned a like amount. A carriage for supporting the cutter assemblies is provided by the transverse bars 42 and 44 which are linked together with connectors 46. The connectors 46 are securely attached to the threaded shafts 24 and 26 so as to rise and fall with the shafts and maintain their parallel relationship with the belts 16 and 18. Attached to the carriage is a motor mount 52 which rises and falls with the carriage.

The cutter assembly 12 is mounted on a sub-frame 54 to which are attached vertical guides 56, 57, 58, and 59 which are arranged in pairs, forming close fitting slots in which knife 62 can slide up and down freely. The knife 62 has slots 60 therein and is held in place on the vertical guides by means of the bolts 64 and 66. Thus the knife can move up or down by the length of the slots. Compression springs 68 and 70 normally bias the knife to the bottom of the slots 60 and give the knife blade a floating action. Desirably, the springs include guides 72 to keep the springs from deflecting to one side. The knife itself has a tip portion 74 and a horizontal portion 76. The tip portion 74 makes an angle of about 20° with the horizontal portion 76. It will thus be seen that the knife has a floating action and can tilt or raise against the action of the springs.

Mounted on the knife is the shroud designated 78. The shroud itself consists of a pair of metal backing members 80 and 82 which are mirror images of each other. Blade 62 is provided with slots 84 and 86 and the halves of the shroud are bolted into these slots by means of the bolts 88. It will thus be seen that the shrouds can be located at various heights with respect to the blade edge by adjustment of the bolts 88. The shrouds themselves comprise a rubber liner 90 secured by a suitable adhesive to the backing members and include a plurality of small rubber fingers 92 for gripping the fruit. The front end of the shroud is curved upwardly as at 94 to produce a wedging action as the fruit first encounters the shroud. The shrouds extend the length of the knife and continue over the pit kicker blade.

The pit kicker itself which forms the crux of the present invention has been generally designated 96. The pit kicker includes a vertical forward surfaces 98 and an angular forward edge 100 which forms roughly a 30° angle with the knife blade. The pit kicker 96 is mounted on an arm 102 carried on a pivot 104 and includes an upwardly extending arm 106 terminating in a cam follower 108. A compression spring 110 mounted between arm 102 and support plate 55 urges the pit kicker downwardly and the cam follower 108 into contact with a cam 112. Cam 112 is mounted on shaft 114 which is driven by prime mover 116 through belt 118. In this manner, the pit kicker 96 is given an oscillatory motion and, since the arc through which it moves is quite small, this motion is almost entirely vertical.

The pit engaging portion of the pit kicker can take various forms. In the form shown in FIGURE 6 as well as in the FIGURE 3, the fruit engaging portion 100 has flat face with square edges so that it either hits the pit with its flat face or, if it hits to one side of the pit, the sharp edge beween the face and the side of the kicker will tend to engage and dig into the pit. This effect can be further enhanced in the embodiment shown in FIGURE 7. Here the pit engaging edge, designated 100–A is hollow-ground having sharp ridges on each side of the hollow center. As can be seen from FIGURE 7, these sharp ridges will tend to engage a pit and dislodge it. The effect can be even further enhanced in the form shown in FIGURES 8 and 10 wherein the pit is given a serrated edge as at 100–B. It is obvious that such an edge having a series of sharp points will tend to dig into the pit and positively disengage it from the apricot.

The action of the device is as follows: As an apricot passes down the V-belts 16 and 18 it is first engaged by the sloping tip end of blade 62 designated 74. The forward tip of this blade is higher than the highest position of any apricot to be encountered. Thus the apricot wedges under the blade and as the belts propel the apricot forward the knife slices almost into the pit, whereupon the shrouds engage the apricot retarding the upper surface, and give it a positive rotating action. Thus the apricot tends to roll along the flat portion 76 of the knife making at least one complete revolution, completely severing the apricot. Desirably, the knife goes just to the pit and the action of the shroud is not only to cause the rotating action but also to prevent the knife from penetrating the apricot deeper than is desired. Thus an important aspect of the invention is the adjustability feature wherein the shrouds can be adjusted to give any desired depth of cut. Further, by adjusting the entire carriage, the pressure on the apricots can be adjusted so that an undue amount of pressure will not be exerted by the shrouds, tending to crush the apricots when running large fruit. Since apricots are ordinarily pre-sorted for size, the machine of the present invention is ideally adjusted to run a single size of fruit by means of the two adjustments described above, although considerable variations in size of fruit can be encountered with reasonably satisfactory results.

It has been found that about ¼ inch of pit kicker travel is adequate to secure a good job of pit removal. On a machine running at a belt speed of slightly over 800 inches per minute, a frequency of 1200 chops per minute was employed with satisfactory results. This gives the blade about three chops at each pit. The action which probably happens to a stuck pit is somewhat as follows: With the blade in an up or partially down position, the pit engages the kicker and is stopped in its forward motion. The down stroke would then push the pit some portion of ¼ inch out of its contact position. When the knife retracts the apricot and pit are urged forward further by the action of the belt combined with the sloping portion of the pit kicker so that the pit is further dislodged by each stroke. Two or three strokes of the pit kicker probably move the pit downwardly from ⅛ to ⅜ inches from its original location, which is adequate to detach it from the apricot half. When comparing the oscillating pit kicker of the present invention with a stationary knife with a fixed heel such as shown in the prior art, the number of stuck pits remaining in the cut fruit was reduced by a factor of five to ten.

Although the oscillating pit kicker has been described for use in conjunction with a particular type of slitting knife, and is preferably so used, the kicker may be employed with other slitting devices.

It is believed obvious from the foregoing that I have provided a superior machine for slitting apricots and one which essentially solves the problem of stuck pits.

I claim:

1. In a drupe pitting machine having means for propelling drupes over a path of travel wherein each drupe is positioned with its suture in a vertical plane as such drupe is delivered to a cutting station whereat a knife is positioned above the path of travel of the drupe with its blade extending generally in said vertical plane and with the cutting edge on said blade extending parallel to said path of travel whereby the flesh of each drupe is severed into the pit therein at said cutting station; the improvement comprising:
   (a) a pit kicker comprising a planar blade having a downwardly extending edge for disengaging a pit in a drupe which has been cut by the knife;
   (b) means mounting the pit kicker blade in said vertical plane with the forward end of said edge adjacent the end of the knife;
   (c) and means for oscillating the pit kicker blade up and down independently of said knife to impart a rapid chopping motion.

2. The structure of claim 1 wherein the pit kicker blade has a pit engaging edge which extends at about a 30° angle to the path of travel of the drupes.

3. The structure of claim 2 wherein said edge is a straight edge.

4. The structure of claim 2 wherein said edge has sharp ridges thereon.

5. The structure of claim 2 wherein said edge is serrated.

6. The structure of claim 1 wherein:
   (a) the knife is spring mounted in said plane over the path of travel of the drupes and parallel thereto;
   (b) and shrouds extending from each side of the knife and sloping downwardly therefrom to cause the fruit to rotate in its passage under the knife;
   (c) the forward portion of said knife extending ahead of said shrouds, whereby the knife enters a drupe before the shrouds engage the drupe.

7. The structure of claim 6 wherein each shroud is provided with a surface which increases the frictional grip of the shroud on a drupe to insure the rotation of the drupe.

8. The structure of claim 1 wherein said pit kicker blade is oscillated at a rate such that the pit in each drupe is engaged with the blade several times as the drupe passes the blade.

9. The structure of claim 6 wherein each shroud is provided with means whereby the shroud can be raised and lowered with respect to the knife.

10. The structure of claim 6 wherein the shroud extends over both the knife and the pit kicker.

References Cited

UNITED STATES PATENTS

| | | | |
|---|---|---|---|
| 1,334,162 | 3/1920 | Moltzner | 146—72 X |
| 2,474,492 | 6/1949 | Perrelli et al. | 146—17 |
| 2,664,127 | 12/1953 | Perrelli | 146—28 |
| 2,735,466 | 2/1956 | Krstinich | 146—72 |
| 2,745,453 | 5/1956 | Perrelli et al. | 146—28 |
| 2,882,944 | 4/1959 | Lorenzen | 146—28 |
| 3,194,290 | 7/1965 | McClelland et al. | 146—238 |
| 3,241,586 | 3/1966 | Petersen et al. | 146—28 |

W. GRAYDON ABERCROMBIE, *Primary Examiner.*